United States Patent [19]
Whitt et al.

[11] Patent Number: 5,117,976
[45] Date of Patent: Jun. 2, 1992

[54] DISPLAY PACKAGING FOR BATTERIES

[75] Inventors: Richard D. Whitt, Chula Vista; James R. Parker, Escondido, both of Calif.

[73] Assignee: Sanyo Energy (U.S.A.) Corp., San Diego, Calif.

[21] Appl. No.: 640,194

[22] Filed: Jan. 9, 1991

[51] Int. Cl.⁵ .............................................. B65D 85/20
[52] U.S. Cl. .................................... 206/333; 206/446; 206/497; 206/806
[58] Field of Search ............... 206/328, 333, 446, 497, 206/806; 229/4.5, 93

[56] References Cited

U.S. PATENT DOCUMENTS

| | | | |
|---|---|---|---|
| 1,587,356 | 6/1926 | Riebeth | 206/333 |
| 2,528,959 | 11/1950 | Kingston | 206/446 |
| 3,734,279 | 5/1973 | Fisher, Jr. | 206/333 |
| 3,881,601 | 5/1975 | Walus et al. | 206/333 |
| 4,130,200 | 12/1978 | Iepson et al. | 206/446 |
| 4,166,532 | 9/1979 | Tsuchida et al. | 206/333 |
| 4,205,121 | 5/1980 | Naitoh | 206/333 |
| 4,265,984 | 5/1981 | Kaye | 206/333 |
| 4,971,197 | 11/1990 | Worley | 206/333 |
| 5,018,622 | 5/1991 | Hartley | 206/333 |

*Primary Examiner*—Jimmy G. Foster
*Attorney, Agent, or Firm*—Pillsbury Madison & Sutro

[57] ABSTRACT

One or more batteries are packaged in a transparent plastic tube having opposite end caps, one of which having an integral foldable handle for hanging the tube on a display rack. The batteries are positioned within the tube by a spacer member adapted for the particularly shape of the battery when other than "D" size cells are being sold. The assemblage is covered and held together by a transparent shrink wrap which has an opaque portion printed about a semi-circumference thereof leaving a window through which a consumer can see the batteries being purchased. Once the shrink wrap is removed, the remainder can be used to store those batteries which are not immediately put into use or as a recycling mailer for returning batteries which are recyclable.

23 Claims, 3 Drawing Sheets

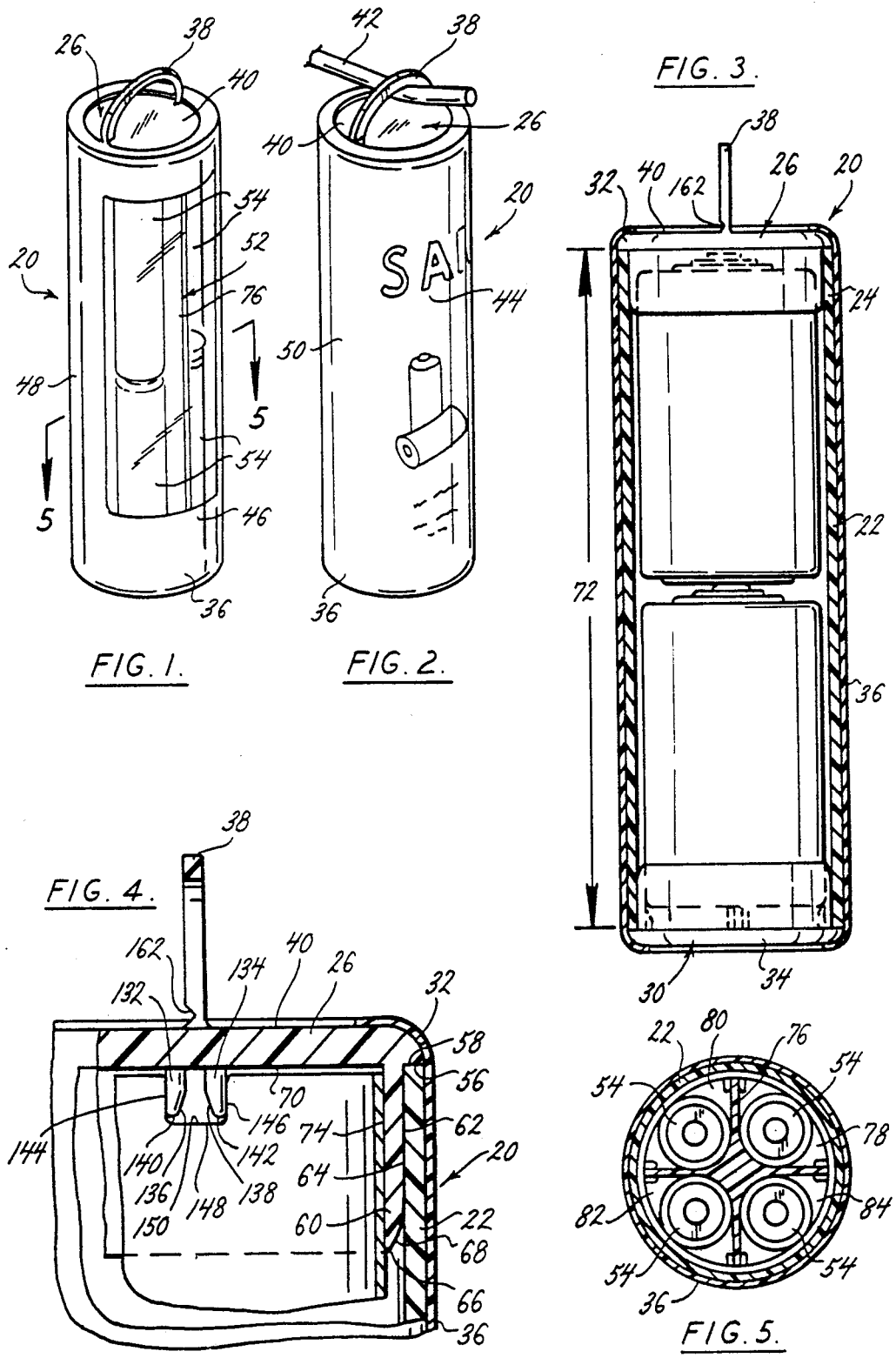

DISPLAY PACKAGING FOR BATTERIES

TECHNICAL FIELD

This invention relates to packaging for batteries and like items for use in displaying the batteries to tho consumer in a novel manner to attract the consumer notice and to provide a reusable container for battery storage or return for recycling.

BACKGROUND OF THE INVENTION

Consumer batteries, whether they be zinc acid, alkaline, lithium, nickel cadmium (Ni-Cad) rechargeable, or the like usually are sold in blister packs or loose in bins. Blister packs normally are comprised of a heavy cardboard sheet with printing thereon, batteries stacked on the sheet, and a suitably shaped clear plastic cover (blister) enclosing the batteries against the sheet with the periphery of the plastic cover being sealed to the cardboard sheet. Such blister packaging, rather than batteries just loosely tossed in a bin, is desireable since it eliminates any chance that the batteries might be shorted out or drained by an unintentional conductive path. Being sealed, the blister packs also assure the consumer that the batteries being bought are fresh and have not been previously put into use.

Such blister packs, although advantageous when compared to loose batteries, have disadvantageous features also. They take up a large volume during shipment, are difficult to package in shipping containers without folding or crimping damage and once opened, they are not successfully reusable. This last feature is particularly disadvantageous when four or more batteries are being sold in the same pack but the consumer, although using batteries at a high rate, has a battery powered device which uses less than the total. Usually what happens is the consumer attempts to re-use the blister pack by placing it in a drawer with the batteries loosely in the blister. In most instances the blister and or the cardboard sheet is torn during opening and the batteries just fall out into a drawer where the consumer cannot determine which are new, fresh batteries useful for applications such as portable tape recorders and which, although used, might be satisfactory for low current applications like clocks.

When marketing consumer items like batteries, where many manufacturers are competing with very similar products, it is desirable from a marketing standpoint to have a distinctive package. Heretofore, the distinctiveness of such blister packages has relied upon the printing thereon since for the same type battery, most blister packs are identical in shape.

BRIEF DESCRIPTION OF THE INVENTION

The present invention is a novel package for small batteries being sold at the retail level. It includes a clear plastic tube of a diameter and length sufficient for two "D" size batteries to fit therein. The tube is closed by opposite end caps which frictionally fit within the tube. The end caps include an abutment lip to restrict the distance they can be pushed inside the tube. The top cap includes an integral semi-circular handle attached in such a manner that although it tends to stand upwardly from the top surface of the cap, it can be folded over for storage or shipment without damage. When batteries other than "D" cells are to be displayed and sold within the transparent tube to hold one or more batteries in a pre-determined orientation there within. The assemblage is then sealed by means of a shrink wrap tube which extends over portions of both end caps and the entire transparent tube. The shrink wrap has generally opaque areas on which product information, bar coding, trademarks and other advertising is printed. However, a portion of the shrink wrap is transparent. This transparent portion is indexed to the batteries within the tube so that the consumer can look at the batteries within the tube through the shrink wrap.

The invention can be used to store a portion of the batteries purchased but not put into immediate use after the package is opened, and may be used to return worn out batteries of recyclable types such as Ni-Cads, to prevent the components of the batteries, which may be toxic, from entering landfills or other disposal sites. The package also may include a return mailing label, either printed on the outside of the clear plastic tube in the areas normally covered during initial marketing by the opaque area of the shrink wrap, or by means of a recycle label within the tube which can remain within the tube or be taped to the outside when the invention is used as a shipping container for recycling.

Therefore, it is the object of the present invention to provide unique distinctive packaging for small batteries which immediately catches the consumer's eye.

Another object is to provide packaging for batteries, which once opened, can be used to securely store batteries not put in immediate service.

Another object is to provide packaging which can be used to ship batteries for recycling once their useful life has been expended.

Another object is to provide a single unique type packaging which can be used for a pair of "D" cells down to the smallest consumer batteries.

Another object is to provide battery packaging which is adaptable to automation.

These and other objects and advantageous of the present invention will become apparent to those skilled in the art after considering the following detail specification together with the accompanied drawings wherein:

BRIEF DESCRIPTION OF THE DRAWINGS

FIG. 1 is a perspective view of the backside of the present invention showing batteries therein through its transparent window;

FIG. 2 is a perspective view of the package of FIG. 1 hanging on a rack as it is typically expected to be displayed;

FIG. 3 is a partial cross-sectional view of the package of FIGS. 1 and 2 with a pair of D size batteries therein;

FIG. 4 is an enlarged detailed view of the present invention showing a portion of its top cap;

FIG. 5 is a cross-sectional view taken at line 5—5 of FIG. 1;

DETAILED DESCRIPTION OF THE BEST MODES OF THE INVENTION

Figure 6:
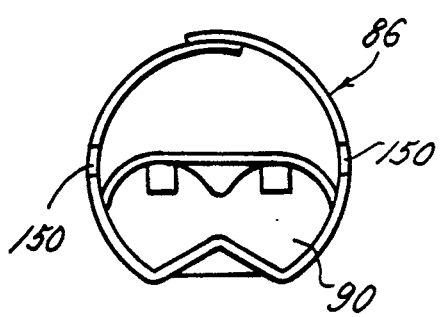
FIG. 6 is a top view of a typical paper spacer retaining a six volt lithium battery.

Referring to the drawings more particularly by reference numbers, number 20 in FIG. 1 refers to battery packaging constructed according to the present invention. The packaging 20 includes a clear plastic tube 22 whose upper end 24 is closed by an upper end cap 26 and whose lower end 28 is closed by a lower end cap 30. The transparent plastic tube 22 and the outer edge portions 32 and 34 of the upper and lower end caps 26 and 30 respectively, are held as an assemblage by means of a surrounding shrink wrap tube 36. The upper end cap 26 includes an integral handle 38 which extends upwardly from the upper surface 40 so that the package 20 can be hung by means of the handle 38 on suitable display racks, a hook 42 of such a rack being shown in FIG. 2.

The packaging 20 has a front 44 defined by a generally opaque area of the shrink wrap tube 36 on which trademarks product representations, and other consumer attracting indicia can be provided. It should be noted that the handle 38 is connected at the left and right hand sides 48 and 50 of the upper end cap 26 so that when properly hung on the hook 42 the front 44 faces the consumer.

The rear 46 of the shrink wrap tube 36 includes a transparent window 52 through which the batteries in the case of FIG. 1, eight AA cells 54, can be seen by the consumer without opening the packaging 20. This enables a consumer to be assured that the desired batteries are being purchased. Many consumers are confused by cell names such as AA, AAA, C, D and are more comfortable buying batteries that look like the batteries they are replacing. The window 52 may extend only a portion of the length of the packaging 20 as shown in FIG. 1 or may extend from one end cap 26 to the other 30. The window 52 may be provided by a transparent strip of material longitudinally along the shrink wrap tube 36 or may be provided by having a shrink wrap tube 36 which is basically transparent with opaque printing thereon to outline the window 52.

The end caps 26 and 30 can be essentially identical except for the handle 38 so the following description of the upper end cap 26 can apply to the lower end cap as well. As shown in FIG. 4, the upper end cap 26 includes an underside radial abutment surface 56 which engages the upper end surface 58 of the tube 22. When assembled, a lower cylindrical member 60 extends downwardly from the cap 26 into the interior of the plastic tube 22 with its outer cylindrical surface 62 in frictional engagement with the inner cylindrical surface 64 of the tube 22. The tip 66 of the cylindrical member 60 includes a conical or semi-toroidal surface 68 which slopes toward the surface 62 as it extends from the tip 66 to enable easy insertion thereof within the tube 22.

The radial abutment surface 56 is generally planar with the interior radial surface 70 of the end cap 26 so that the longitudinal length 72 of the tube 22 and the inner cylindrical surface 74 of the caps 26 and 30 define the volume in which batteries can be placed in the packaging 20. Preferably, the length 72 of the tube 22 and the diameter of the inner cylindrical surface 74 allows two D size cells to be placed there within. Other smaller battery sizes require a spacer. A cruciform cross-section spacer 76 is shown in FIG. 5. The spacer 76 has four chambers 78, 80, 82, and 84, each of which being capable of holding two AA batteries. Therefore, the spacer 76 is used when 2, 4, 6, or 8 AA or AAA batteries are placed within the packaging 20. Other spacers 86 and 88 are shown in FIGS. 6 and 7 respectively.

Figure 7:
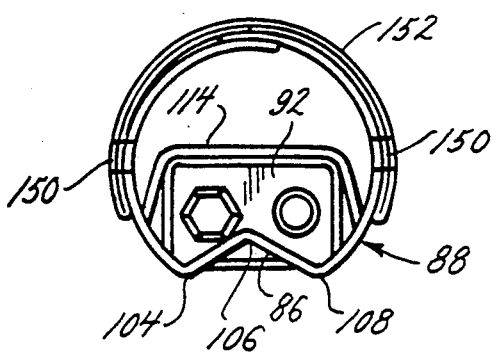
FIG. 7 is a top view of a spacer similar to that shown in FIG. 6, holding a 9 volt battery and also showing a return mailing label wrapped thereabout.

In FIG. 6, a six volt lithium battery 90 is shown supported by the spacer 86 whereas in FIG. 7, a nine volt battery 92 is supported by the spacer 88. The spacers 76, 86, and 88 can be constructed from any suitable material such as paper, plastic or styrofoam. Spacers, like spacers 86 and 88, can be made from a single sheet of material which is rolled, cut and folded.

Figure 8:
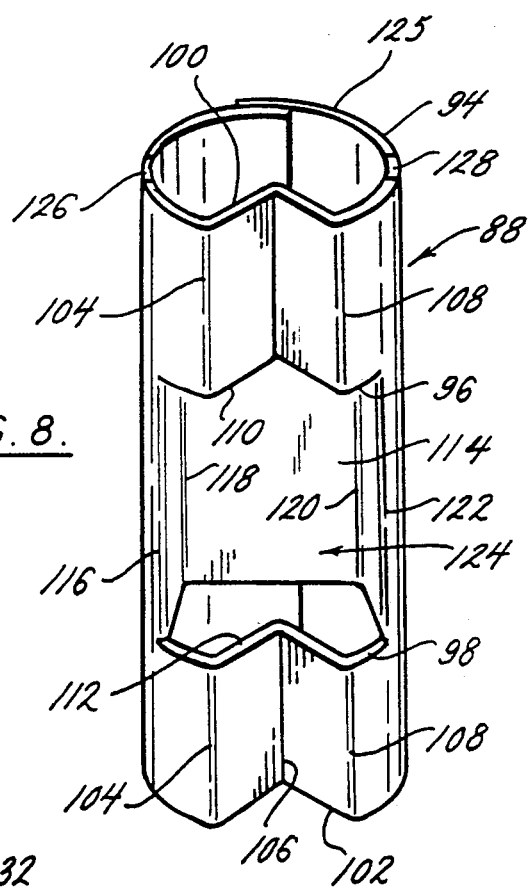
FIG. 8 is a perspective view of the spacer of FIG. 7.
Figure 9:
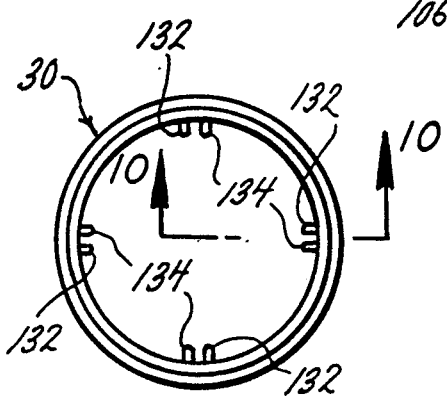
FIG. 9 is a top view of a lower end cap showing optional indexing means there within.
Figure 10:
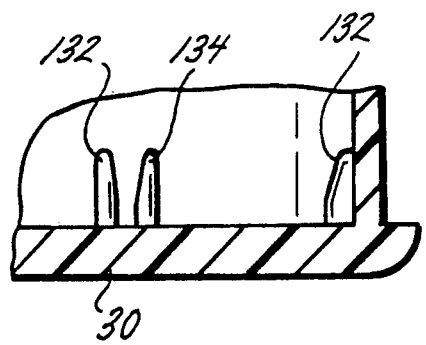
FIG. 10 is a cross-sectional view taken at line 10—10 in FIG. 9.

The construction of a spacer can be more clearly seen in FIG. 8 wherein a sheet of card stock 94 has been formed into the spacer 88. The center of the sheet 94 includes two horizontal cuts 96 and 98. The upper center portion 100 above the cut 96 and the lower center portion 102 below the cut 98 are folded at creases 104, 106 and 108 so that the portions 100 and 102 have a depressed V-shape. The edge surfaces 110 and 112 of the cuts 96 and 98 respectively, become abutment surfaces which prevent a packed battery from moving from end to end in the packaging 20. The central portion 114 between the cuts 96 and 98 is folded with four creases 116, 118, 120 and 122 so that the back wall 124 formed between the creases 118 and 120 is capable of supporting a battery forward in abutment with the edge surfaces 110 and 112. The upper edge 125 of the sheet 94 is shown including indexing notches 126 and 128. Similar indexing notches may be included in the lower edge 130 as well. The notches 126 and 128 are used in combination with tangs 132 and 134 which can be formed at the intersection of the radial surface 70 and the inner cylindrical surface 74, as shown in FIG. 4. Pairs of tangs 132 and 134 are used so that the cruciform spacer 76 can be held there between. It should be noticed that the inner surfaces, 136 and 138 of the tangs 132 and 134 are curved inwardly from the tips 140 and 142 to allow easy insertion of the cruciform spacer 76. The vertical edges 144 and 146 of the notches 126 and 128 may slope inwardly toward the bottom 148 thereof, to provide easy insertion about the tangs 132 and 134. As shown in FIG. 7, indexing notches 150 also may be included in a folded product brochure and return label 152. The label preferably is positioned between the spacers and the tube 22 toward the front thereof. The indexing notches 150 and tangs assure that the spacer and the label 152 does not rotate during shipment to obscure the view of a battery through the window 52. As shown in FIG. 9, the tangs 132 and 134 may be placed every 90 degrees around the cap, although only one pair of tangs is required to prevent rotating movement within the tube 22.

Figure 11:
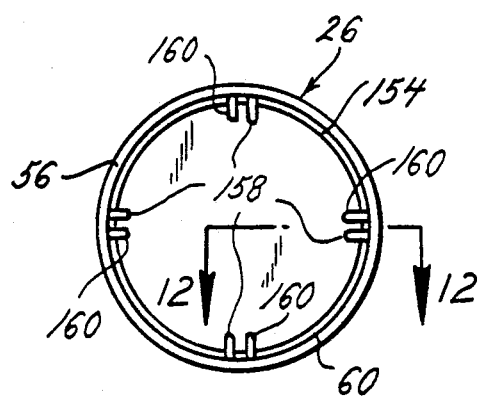
FIG. 11 is a bottom view of a top cap having modified indexing means.
Figure 12:
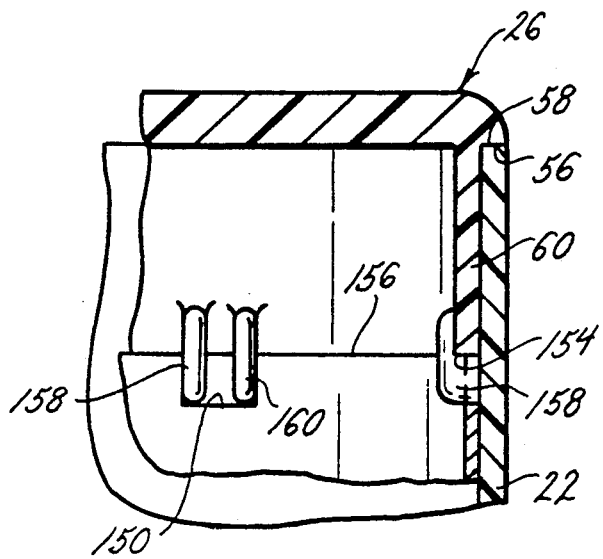
FIG. 12 is a cross-sectional view taken on Line 12—12 of FIG. 11 showing the modified indexing means in detail.

In some instances of automated assembly, it is difficult to get the sheet 94 of a spacer to slide easily within the cylindrical member 60. In those instances, as shown in FIGS. 11 and 12, an abutment surface 154 is provided at the tip 66 of the cylindrical member 60 so that the upper edge 156 of the spacer can abut there against. In those instances, tangs 158 and 160 extend from the abutment surface 154 to engage the spacer and prevent rotation thereof. In some instances, the label 152 will engage the tip 66 whereas the spacer 86 or 88 will extend to the radial surface 70 of the cap. This can be accommodated with longer notches in the spacers 86 or 88. The spacer 76 is unaffected since it fits between the tangs.

Figure 13:
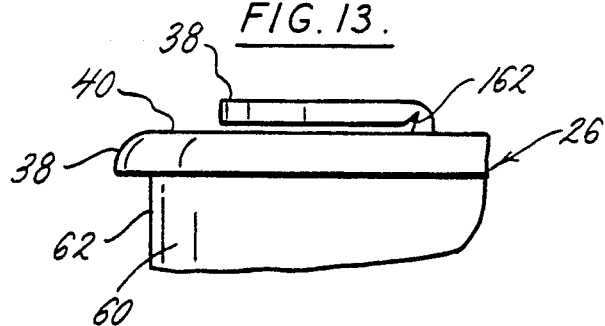
FIG. 13 is a large detail view showing the handle on the top cap in its folded position.
Figure 14:
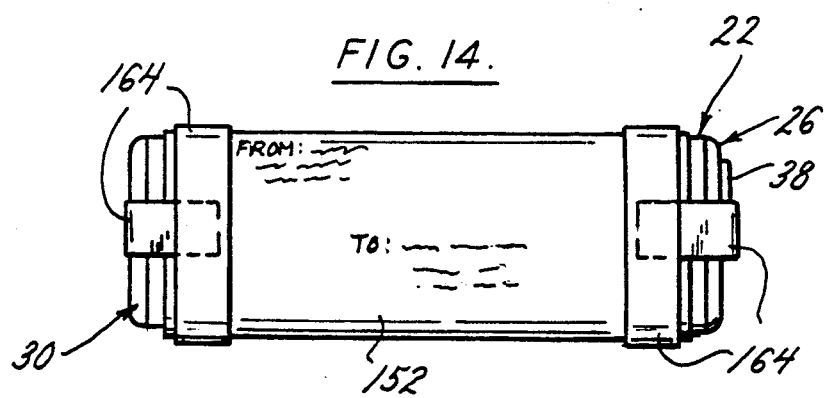
FIG. 14 shows the package of FIG. 1 as it appears when used as a shipping container returning batteries for recycling.

As shown in FIG. 13, the handle 38 can be folded down parallel to the upper surface 40 of the cap 26 for shipment. This folding is allowed by notches 162 therein adjacent the surface 40. Therefore, when the package 20 is used as a mailer for recycling batteries, adhesive tape 164 can be used to hold the handle 38 down, securely maintaining the caps 26 and 30 to the ends of the tube 22 and attaching the mailing label 152 about the tube 22.

Thus, there has been shown and described novel packaging for small consumer batteries, which fulfills all the objects and advantages sought therefore. Many changes, modifications, variations, and other uses and applications of the subject battery packaging will become apparent to those skilled in the art after considering this specification and the accompanying sheets of drawing. All such changes, modifications, variations and other uses and applications, which do not depart from the spirit scope of the invention are deemed to be covered by the invention which is limited only by the claims which follow.

What is claimed is:

1. Packaging for displaying small batteries to consumers including:
   a transparent tube having:
      an inner cylindrical surface;
      an outer cylindrical surface;
      a first end having:
         a first end abutment surface thereon; and
      a second end having:
         a second end abutment surface thereon;
   a first end cap having:
      a first end cap outer surface;
      a handle extending from said first end cap outer surface;
      a first end cap inner surface generally parallel to said first end cap outer surface;
      a first end cap cylindrical portion extending from said first end cap inner surface and having:
         a first end cap cylindrical portion outer cylindrical surface sized for sliding frictional engagement with said inner cylindrical surface of said transparent tube; and
         a first end cap radial abutment surface about said first end cap cylindrical portion for removable engagement with said first end abutment surface of said transparent tube;
   a second end cap having:
      a second end cap outer surface;
      a second end cap inner surface generally parallel to said second end cap outer surface;
      a second end cap cylindrical portion extending from said second end cap inner surface and having;
         a second end cap cylindrical portion outer cylindrical surface sized for sliding frictional engagement with said inner cylindrical surface of said transparent tube; and
         a second end cap radial abutment surface about said second end cap cylindrical portion for removable engagement with said second end abutment surface of said transparent tube; and
   a shrink wrap tube surrounding said transparent tube and at least a portion of said first and second end caps, said shrink wrap tube having at least a portion thereof which is transparent.

2. The packaging as defined in claim 1 wherein said handle is a semi-circular loop having:
   first and second sides; and
   first and second opposite ends integrally connected to said first end cap outer surface by notches which allow said handle to be folded sideways parallel to said first end cap outer surface.

3. The packaging as defined in claim 2 wherein said shrink wrap tube has:
   an opaque portion which extends longitudinally thoroalong spaced from said first side of said handle.

4. The packaging as defined in claim 3 wherein said first end cap includes:
   indexing means thereon in a predetermined radial relationship to said handle, said packaging further including:
   a spacer having:
      means thereon to engage said indexing means to maintain said spacer in a predetermined radial relationship to said first end cap; and
      means adapted to hold at least one battery in a predetermined spacial relationship thereto where the battery can be seen through said transparent portion of said shrink wrap tube.

5. The packaging as defined in claim 4 wherein said spacer has a cruciform cross-section.

6. The packaging as defined in claim 4 wherein said spacer is a rolled sheet having:
   a first end portion having:
      a first end portion outer edge;
   a second end portion opposite said first end portion having:
      a second end portion outer edge; and
   a center portion defined from said end portions by cuts generally parallel to said first and second end portion outer edges, central portions of said first and second end portions being bent inwardly and central portions of said center portion being shaped to fit at least a portion of the sides of at least one battery.

7. The packaging as defined in claim 6 wherein said spacer further includes at least one notch in said first end portion outer edge to engage said indexing means.

8. The packaging as defined in claim 7 wherein said first cap cylindrical portion has:
   a first end cap cylindrical portion inner cylindrical surface, and wherein said indexing means include:
   at least one pair of tangs extending inwardly from said first end cap cylindrical portion inner cylindrical surface.

9. The packaging as defined in claim 8 wherein said at least one pair of tangs extend toward said second end cap from said first end cap cylindrical portion.

10. The packaging as defined in claim 1 wherein said second end cap includes:
    indexing means thereon in a predetermined radial relationship to said portion of said shrink wrap tube which is transparent, said packaging further including:
    a spacer having:
       means thereon to engage said indexing means to maintain said spacer in a predetermined radial relationship to said portion of said shrink wrap tube which is transparent; and means adapted to hold at least one battery in a predetermined spacial relationship thereto where the battery can be seen through said transparent portion of said shrink wrap tube.

11. The packaging as defined in claim 10 wherein said spacer is a rolled sheet having:
 a first end portion having:
  a first end portion outer edge;
 a second end portion opposite said first end portion having:
  a second end portion outer edge; and
 a center portion defined from said end portions by cuts generally parallel to said first and second end portion outer edges, central portions of each of said first and second end portions being bent inwardly in a general V shape, and central portions of said center portion being shaped to fit at least a portion of the sides of at least one battery.

12. The packaging as defined in claim 11 wherein said spacer further includes at least one notch in said second end portion outer edge to engage said indexing means.

13. The packaging as defined in claim 12 wherein said second cap cylindrical portion has:
 a second end cap cylindrical portion inner cylindrical surface, and wherein said indexing means include:
 at least one pair of tangs extending inwardly from said second end cap cylindrical portion inner cylindrical surface.

14. The packaging as defined in claim 13 wherein said at least one pair of tangs extend toward said first end cap from said second end cap cylindrical portion.

15. Packaging for displaying small batteries to consumers including:
 a transparent member having:
  an inner cylindrical surface;
  an outer cylindrical surface; and
  an end having:
   an end abutment surface thereon;
 an end cap having:
  an end cap outer surface;
  a handle extending from said end cap outer surface;
  an end cap inner surface generally parallel to said end cap outer surface;
  an end cap cylindrical portion extending from said end cap inner surface and having:
   an end cap cylindrical portion outer cylindrical surface sized for sliding frictional engagement with said inner cylindrical surface of said transparent member; and
  an end cap radial abutment surface about said end cap cylindrical portion for removable engagement with said end abutment surface of said transparent member; and
 a sealing tube surrounding said transparent member and at least a portion of said end cap, said sealing tube having at least a portion thereof which is transparent.

16. The packaging as defined in claim 15 wherein said handle has:
 first and second opposite ends integrally connected to said end cap outer surface by means which allow said handle to be folded sideways parallel to said end cap outer surface.

17. The packaging as defined in claim 15 wherein said handle has:
 first and second sides, and wherein said sealing tube has:
 an opaque portion which extends longitudinally therealong spaced from said first side of said handle.

18. The packaging as defined in claim 17 wherein said end cap includes:
 indexing means thereon in a predetermined radial relationship to said handle, said packaging further including:
 a spacer having;
  means thereon to engage said indexing means to maintain said spacer in a predetermined radial relationship to said first end cap; and
  means adapted to hold at least one battery in a predetermined spacial relationship thereto where the battery can be seen through said transparent portion of said sealing tube.

19. The packaging as defined in claim 18 wherein said spacer has a cruciform cross-section.

20. The packaging as defined in claim 18 wherein said spacer is formed from a rolled sheet having:
 a first end portion having:
  a first end portion outer edge;
 a second end portion opposite said first end portion having:
  a second end portion outer edge; and
 a center portion defined from said end portions by cuts generally parallel to said first and second end portion outer edges, central portions of each of said first and second end portions being bent inwardly and central portions of said center portion being shaped to fit at least a portion of the sides of at least one battery.

21. The packaging as defined in claim 20 wherein said spacer further includes at least one notch in said end portion outer edge to engage said indexing means.

22. The packaging as defined in claim 21 wherein said first cap cylindrical portion has:
 an end cap cylindrical portion inner cylindrical surface, and wherein said indexing means include:
 at least one pair of tangs extending inwardly from said end cap cylindrical portion inner cylindrical surface.

23. The packaging as defined in claim 22 wherein said at least one pair of tangs extend longitudinally away from said end cap from said end cap cylindrical portion.

* * * * *